Feb. 19, 1952     R. C. BAKER ET AL     2,586,143
STEAM TRAP
Filed July 5, 1946
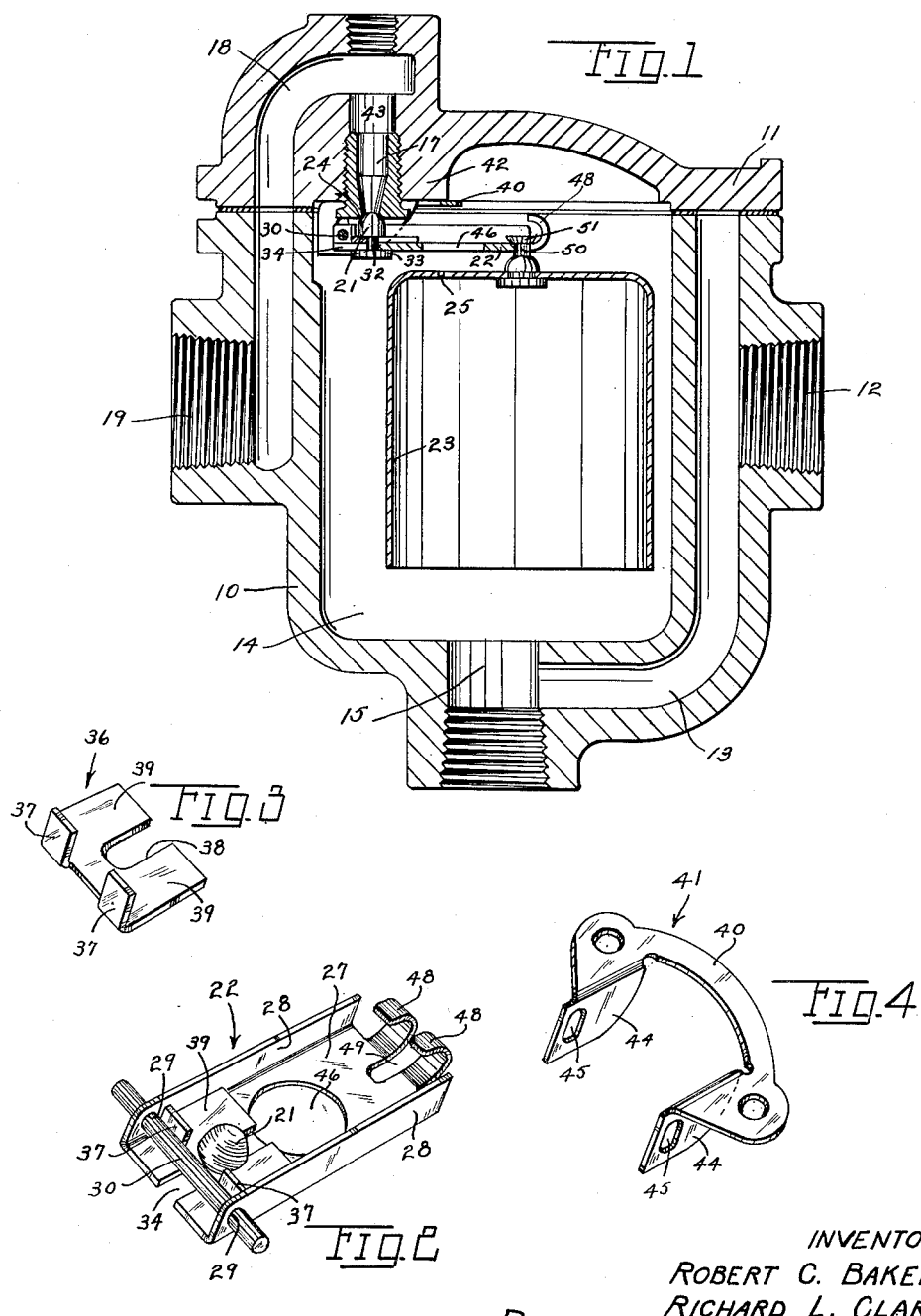
INVENTORS
ROBERT C. BAKER
RICHARD L. CLARK
By Hyde, Meyer, Baldwin & Doran
ATTORNEYS Patented Feb. 19, 1952

2,586,143

UNITED STATES PATENT OFFICE 2,586,143

STEAM TRAP

Robert C. Baker, Corry, Pa., and Richard L. Clark, East Cleveland, Ohio, assignors, by mesne assignments, to Strong Steam Specialty Mfg. Co., Cleveland, Ohio, a corporation of Ohio Application July 5, 1946, Serial No. 681,582

3 Claims. (Cl. 137—103)

This invention relates to steam traps of the inverted bucket type. In this type of steam trap, there is a main chamber into which enters steam, condensate and air from the steam system in which the trap is mounted, and from which chamber the condensate and air are intermittently discharged. The discharge from such chamber is controlled by a valve which is generally carried by a lever pivotally mounted in the chamber and to which is connected an inverted bucket, the bucket constituting a float to open or close the valve as the bucket sinks or floats in accordance with or in response to the amount of condensate and air in the chamber.

The present invention has for its object the provision of an inverted bucket steam trap which is characterized by improvements in the construction of the valve lever, the means by which the valve is connected thereto for movement therewith, the means by which the inverted bucket is connected to the lever for suspension therefrom, and the means by which the lever is pivotally mounted.

The nature of such improvements, and certain of their advantages, will be referred to in the following description of a steam trap embodying the present invention, as illustrated in the accompanying drawing, in which Fig. 1 is a vertical sectional view of such steam trap;

Fig. 2 is a perspective view of the improved valve lever;

Fig. 3 is a similar view of the valve-retaining member of said lever; and

Fig. 4 is a similar view of the mounting bracket for said lever.

Before the steam trap here illustrated is specifically described, it is to be understood that the invention here involved is not limited to the structural details or the particular arrangement of parts here shown, as embodiments of the present invention may take various forms. It also is to be understood that the phraseology or terminology herein employed is for the purpose of description and not of limitation, the scope of the present invention being denoted by the appended claims.

The steam trap here illustrated, for the disclosure of one embodiment of the present invention, comprises a cup-shaped casing 10 closed at its top by a cover member 11 bolted or otherwise suitably secured thereto. At one side thereof, the casing is provided with an inlet port 12 for the connection of the trap in a steam system from which condensate and air are to be evacuated by trap operation.

As will be evident from Fig. 1, steam, condensate and air entering the trap through the inlet port 12 thereof travel down the casing inlet passageway 13 and pass into a float chamber 14 which is the main chamber of the trap, the inlet opening 15 of such chamber being at the bottom thereof. From this chamber, condensate and air are intermittently expelled, in the operation of the trap and as will hereinafter more fully appear, through a discharge orifice 17 into an outlet passageway 18 which leads to an outlet port 19 with which the casing 10 is provided.

The discharge orifice 17 of the float chamber is controlled by a valve 21 which is carried by and secured to a lever 22 pivotally mounted in the float chamber and from which is suspended an inverted bucket 23 which constitutes a float for the operation of said lever. When sufficient steam or air is trapped in the bucket and there is a substantial amount of liquid condensate in the float chamber, the bucket floats and the valve 21 is thus held against its seat on the lower end of the orifice member 24, with the consequent closing of the discharge orifice 17 of such member by the valve. When, however, the liquid condensate within the bucket rises beyond a critical level, due to escape of air or steam through the vent aperture 25 in the top wall of such bucket, the bucket sinks, with consequent movement of the valve 21 from its seat and the opening of the discharge orifice 17. Thereupon, condensate and air are discharged through such orifice into the outlet passageway 18 by the pressure of the steam within the float chamber, the orifice remaining open until the bucket 23 is again raised to floating position and the valve 21 thereby lifted into engagement with its seat on the orifice member 24.

As heretofore mentioned, the invention here involved relates to improvements in the valve lever 22, the means by which the valve 21 is secured thereto for movement therewith, the means by which the inverted bucket 23 is connected to the lever for suspension therefrom, and the means by which the lever is pivotally mounted in the float chamber 14.

As best shown in Fig. 2, the lever 22 of the present trap is of channel-shaped cross section, with a base 27 and upright side flanges 28 which are provided adjacent one end of the base with a pair of horizontally aligned apertures 29 for the reception of a pivot pin 30 upon which the lever swings the end portions of said pin projecting laterally beyond the flanges 28, as shown.

The valve 21 is of the ball head type, with a reduced neck portion 32 and a flanged or headed base 33. For the securement of said valve to the lever 21, the lever base 27 is provided with a longitudinally disposed open-ended slot or notch 34 in the pivoted end portion of the lever, the slot or notch being of sufficient width to snugly but slidably receive the reduced neck portion 32 of the valve. To releasably retain the valve at the closed end of the slot or notch 34, the lever includes a slidable clip member 36 which is shown per se in Fig. 3, the clip being provided at one end with upright flange means, such as the laterally spaced flanges 37, and being provided in its other end portion with a longitudinally disposed open-ended slot or notch 38. For valve retention, after the valve has been slid to the closed end of the lever base slot or notch 34, the clip member 36 is placed in the lever channel, in which it preferably has a snug sliding fit, and slid toward the valve until the closed end of the clip member slot or notch 38 engages the valve neck portion 32, with the two laterally spaced fingers 39 of the clip member lying on opposite sides of the valve neck portion, as shown in Fig. 2. When in this valve-retaining position, the upright flanges 37 of the clip member are engaged by the afterwardly inserted pivot pin 30 of the lever, as in Figs. 1 and 2, so that the clip member as well as the valve 21 are securely held in place, by an assembly operation which is easily, quickly and conveniently made. If desired, the clip member flanges 37 may have a certain amount of resilient yieldability to permit slight elongation of the opening through which the valve neck portion 32 extends and thereby enable the valve to be more or less self-aligning with respect to its seat on the orifice member 24, as will be readily understood.

For the pivotal mounting of the lever in the float chamber 14, a bracket 41 of generally C shape in plan view is here utilized, the bracket being shown per se in Fig. 4. This bracket is screwed or otherwise suitably secured to the bottom face of a boss 42 of the casing cover member 11. The boss 42 is provided the opening 43 which establishes communication between the float chamber 14 and the outlet passageway 18 and in which is mounted the valve-controlled orifice member 24. At its ends, the bracket 41 is provided with depending ears 44 in which are located vertically disposed horizontally aligned slots 45 for the reception of the projecting end portions of the lever pivot pin 30. The pivoted end of the lever 22 is thus mounted between the depending bracket ears 44, with the valve 21 of the lever located for opening and closing co-operation with the float chamber discharge orifice 17 as the lever swings up and down about its pivot in its float controlled operation. As the lever pin 30 has some play, both vertically and horizontally, in the bracket ear slots 45, the valve 21 carried by said lever is self-adjusting with respect to its seat on the orifice member 24, as will be readily understood. Preferably, and as here shown, the base 27 of the lever is provided with a suitable aperture 46 which overlies the bucket vent aperture 25 and which facilitates the flow of air, escaping through the bucket vent, to the top of the float chamber 14 for discharge therefrom when the valve controlled orifice 17 is open.

For the connection of the inverted bucket 23 to the free end of the valve lever 22, the base 27 of said lever is provided with a pair of longitudinally projecting, laterally spaced fingers 48 which are here upwardly and reversely bent, as best shown in Fig. 2. The open-ended slot or notch 49 between such fingers has a width which is sufficient to receive the reduced intermediate portion 50 of an upright stud-like projection 51 with which the top wall of the bucket 23 is centrally provided, the enlarged end portions of said bucket projection on opposite sides of said reduced intermediate portion preferably having opposed generally convex surfaces as shown in Fig. 1.

In order to enable the bucket stud to enter the lever slot or notch 49, inasmuch as the open end of said slot or notch is located above the base 27 of the lever, either the bucket or the lever may be turned upside down and the bucket or the lever or both thereafter moved to cause the bucket to be suspended from the lever in its normal operating position. The connection of the bucket to the lever is such that the bucket has more or less universal movement with respect to the lever, the convex surfaces of the enlarged end portion of the bucket stud permitting such movement, as will be evident from Fig. 1. The connection of the bucket to the lever is effected, of course, prior to the pivotal mounting of the lever, the connection being one which can be easily and quickly made and without the use of screws, bolts or like fastening devices. Inasmuch as the enlarged upper end of the bucket stud-like projection is wider than the lever slot or notch 49. The bucket projection is securely held by the lever when the bucket is in its normal suspended position.

To those skilled in the art to which the present invention relates, other features and advantages of the invention will be evident from the foregoing description of one embodiment of the invention.

Having described our invention, we claim:

1. A valve lever and float assembly for steam traps having a chamber and an outlet opening therefrom, said valve lever and float assembly comprising a lever for pivotal mounting in a steam trap chamber and having a valve for the control of the chamber outlet opening, a float suspended from said lever for effecting pivotal movement of said lever and hence the control of said chamber outlet opening by the valve of such lever, said float being provided with an upstanding stud-like projection having a reduced intermediate portion and said lever having an open-ended slot receiving the reduced intermediate portion of said float projection, the surfaces of the float projection on opposite sides of its reduced intermediate portion being of generally convex form, whereby said float is more or less universally movable relative to said lever when suspended therefrom, and means carried by said lever for preventing said float projection from escaping through the open end of the lever slot when the float is suspended from said lever.

2. A valve lever assembly for steam traps having a chamber containing a float and also having an outlet opening for said chamber, said valve lever assembly comprising a lever having a pivot rod for its pivotal mounting in a steam trap chamber and for operation by the float therein, a valve carried by said lever for controlling the chamber outlet opening in accordance with the rise and fall of said float, said lever being provided with an open-ended slot to slidably receive said valve and further being provided with a member engaging said valve and retaining it at the closed end of the lever slot, said retaining member being provided with resilient flange means and being held in valve-retaining position by the engagement of said pivot rod with its flange means, the resilient character of said flange means permitting some elongation of the valve-receiving slot and thereby more or less self-alignment of the valve with respect to the chamber outlet opening.

3. A valve lever and float assembly for steam traps having a chamber and an outlet opening therefrom, said valve lever and float assembly comprising a lever for pivotal mounting in a steam trap chamber and having a valve for the control of the chamber outlet opening, a float suspended from said lever for effecting pivotal movement of said lever and hence the control of said chamber outlet opening by the valve of such lever, said float being provided with an upstanding stud-like projection having a reduced intermediate portion and said lever having an open-ended slot receiving the reduced intermediate portion of said float projection, the surface of the float projection above its reduced intermediate portion being of generally convex form, whereby said float is more or less universally movable relative to said lever when suspended therefrom, and means carried by said lever for preventing said float projection from escaping through the open end of the lever slot when the float is suspended from said lever.

ROBERT C. BAKER.
RICHARD L. CLARK.

REFERENCES CITED

The following references are of record in the file of this patent:

UNITED STATES PATENTS

| Number | Name | Date |
|---|---|---|
| 870,052 | Schebler | Nov. 5, 1907 |
| 1,031,400 | Tirrill | July 2, 1912 |
| 1,122,994 | Pappano et al. | Dec. 29, 1914 |
| 1,721,338 | Gagnon | July 16, 1929 |
| 1,901,200 | Clark | Mar. 14, 1933 |
| 1,960,999 | Kaye | May 29, 1934 |
| 2,211,880 | Clark | Aug. 20, 1940 |
| 2,276,201 | Kaye | Mar. 10, 1942 |

FOREIGN PATENTS

| Number | Country | Date |
|---|---|---|
| 22,065 | Great Britain | of 1935 |